United States Patent
Vasudevan et al.

(10) Patent No.: US 7,263,582 B2
(45) Date of Patent: Aug. 28, 2007

(54) SYSTEM AND METHOD FOR RAID CONFIGURATION

(75) Inventors: Bharath Vasudevan, Austin, TX (US); Robert L. Nance, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/337,470

(22) Filed: Jan. 7, 2003

(65) Prior Publication Data

US 2004/0133742 A1   Jul. 8, 2004

(51) Int. Cl.
*G06F 12/00* (2006.01)
*G06F 13/00* (2006.01)

(52) U.S. Cl. .................. 711/114; 711/113; 711/154
(58) Field of Classification Search .............. 711/114, 711/100, 113, 154
See application file for complete search history.

(56) References Cited

U.S. PATENT DOCUMENTS

| | | | | |
|---|---|---|---|---|
| 5,657,468 A | * | 8/1997 | Stallmo et al. | 711/114 |
| 5,950,230 A | * | 9/1999 | Islam et al. | 711/156 |
| 6,058,455 A | * | 5/2000 | Islam et al. | 711/114 |
| 6,098,119 A | | 8/2000 | Surugucchi et al. | |
| 6,557,089 B1 | * | 4/2003 | Reed et al. | 711/162 |
| 6,957,291 B2 | * | 10/2005 | Moon et al. | 710/302 |
| 6,993,539 B2 | * | 1/2006 | Federwisch et al. | 707/201 |
| 7,007,046 B2 | * | 2/2006 | Manley et al. | 707/204 |
| 2004/0073747 A1 | * | 4/2004 | Lu | 711/114 |

* cited by examiner

*Primary Examiner*—Tuan V. Thai
(74) *Attorney, Agent, or Firm*—Baker Botts L.L.P.

(57) ABSTRACT

A method and system for storing and updating RAID configuration information in a storage site separate from both the RAID controller and RAID disk drives is disclosed. The configuration information in the storage sites are compared and the configuration of the RAID system is automatically without user intervention. The method may be used in any computer or information handling system.

18 Claims, 3 Drawing Sheets

SYSTEM AND METHOD FOR RAID CONFIGURATION

TECHNICAL FIELD

This invention relates, in general, to information handling systems, and, more particularly, to an information handling system that uses a RAID array.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a RAID system for data storage. A RAID system may include a RAID controller and RAID disk drives. The RAID volume information or configuration information may be maintained in a storage site. For example, PERC 3 RAID cards store the configuration information on both the disk drives and on battery backed up NVRAM. Whenever a mismatch occurs between the disk array information stored on the drives and the disk array information stored on the adapter—which may indicate either an adapter or drive replacement—the user must manually enter the adapter's configuration utility during post and choose which configuration to keep. It is possible for the user to choose incorrectly, corrupting the drive array. Moreover, some embedded RAID on the motherboard (ROMB) implementations store the RAID array's configuration information on the motherboard. If the RAID controller fails, the board containing the failed controller is replaced. In this case, although the drive configuration did not change, the RAID configuration is lost, and the user must re-create the mirror, select one of the "already mirrored" drives and re-create the array. Depending on the size of the hard-drives, this operation can take multiple hours. Therefore, providing an information handling system with the capability to automatically update the RAID configuration following replacement of a RAID component would increase the efficiency of such a system.

SUMMARY

In accordance with the present disclosure, one implementation of a method to update configuration information associated with a RAID system includes identifying storage sites of configuration information, comparing the configuration information stored in the storage sites, configuring the RAID system. The RAID system may include a RAID controller, one or more disk associated drives, and a storage site for configuration information. The configuration information may identify a data storage relationship among the one or more disk drives. At least one of the storage sites for configuration information should be distinct from both the RAID controller and the RAID disk drives.

In accordance with the present disclosure, one implementation of an information handling system that automatically updates configuration information associated with a RAID system includes at least one memory element, a processing unit, and a RAID system. The RAID system includes a RAID controller, one or more associated disk drives, and a storage site for configuration information. The configuration information may identify a data storage relationship among the one or more disk drives. At least one or more storage sites for configuration information should be distinct from both the RAID controller and the RAID disk drives. The information handling system may identify the one or more storage sites of configuration information. The information handling system may compare the configuration information stored at the one or more sites and then configure the RAID system according to the configuration information.

One technical advantage of the disclosed method to automatically update the configuration information of a RAID system is that it minimizes the amount of user input when updating RAID configuration information. By minimizing user intervention, the user is less likely to introduce error into the RAID system. Another technical advantage of the disclosed method to automatically update the configuration information of a RAID system is that it creates a more robust RAID system. By increasing the redundancy of configuration information, the system can automatically determine whether a RAID component has failed. Additionally, the system is more likely to automatically determine the correct RAID configuration in the present of component failure.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
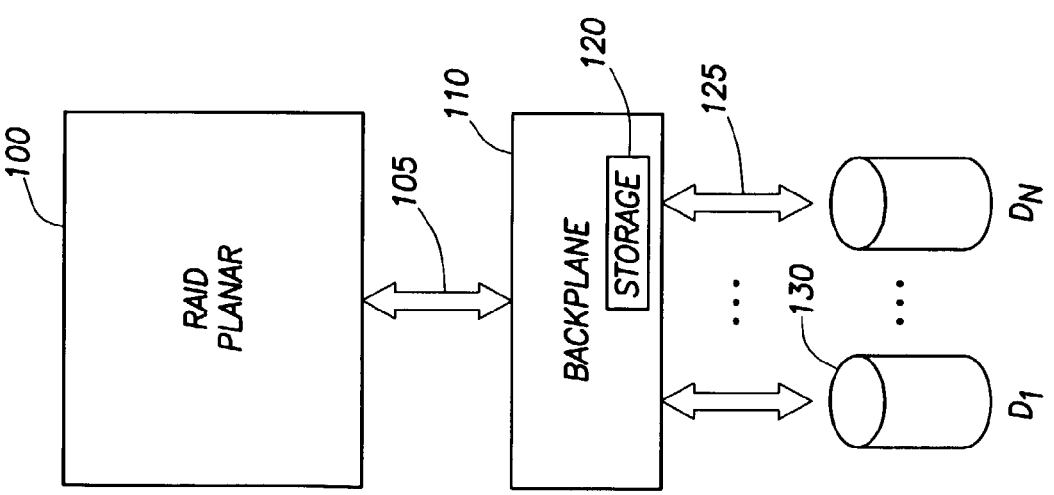
FIG. 1 is a diagram of a RAID system in which the configuration information is stored in the backplane of an information handling system.

An information handling system that includes a RAID array may implement the RAID array in a variety of forms. For example the RAID system may be implemented in level 0, 1, 2, 3, 4, 5, 6, 7, 10, 53 or 0+1. Furthermore, multiple disk drives may be associated with the RAID system as shown in FIG. 1. Configuration information (or RAID volume information) enables the RAID controller to identify the location of data stored on RAID disk 130 and redundancy of the data stored on those RAID disks.

RAID systems may be implemented either as RAID functionality embedded on a system board of a computer or as a RAID adapter card coupled to a computer system board. Different RAID implementations, either embedded or using adapter cards, store the RAID array's configuration information in different places. When a computer's components fail and are replaced, it is possible for that RAID array configuration information to be lost.

One implementation of a method to update RAID configuration information following failure of RAID system component is shown in FIG. 1. FIG. 1 includes a RAID planar 100, a backplane 110 and RAID disks 130. A RAID controller is located on the RAID planar 100. For example, the RAID controller may be located on a board that is coupled to the system board of the information handling system. The RAID controller may also be located on an input/output (I/O) board coupled to the information handling system. Moreover, the RAID controller may be located on the system board or motherboard of the information handling system. Additionally, a RAID system may include an interface 105 between RAID planar 100 and backplane 110 and an interface 125 coupling backplane 110 to RAID disk drives 130. Following replacement of a failed RAID planar, the configuration information of the new RAID planar controller must be updated. Otherwise the RAID controller which is part of the RAID planar 100 would not have information sufficient to discern that disk drives 130 are part of the RAID disk system. Following the update of the configuration information, RAID disk drives 130 would logically appear as a single disk drive to the RAID controller.

When a new RAID controller is connected to the RAID system, the RAID system will be polled to identify storage locations of RAID configuration information. FIG. 1 shows one implementation in which RAID configuration information is stored in the backplane 110. In one implementation the RAID system may prompt the user to accept or reject the configuration information found in storage location 120. In another implementation the RAID system may automatically accept the configuration information found in storage location 120 and update the RAID controller accordingly.

Figure 6:
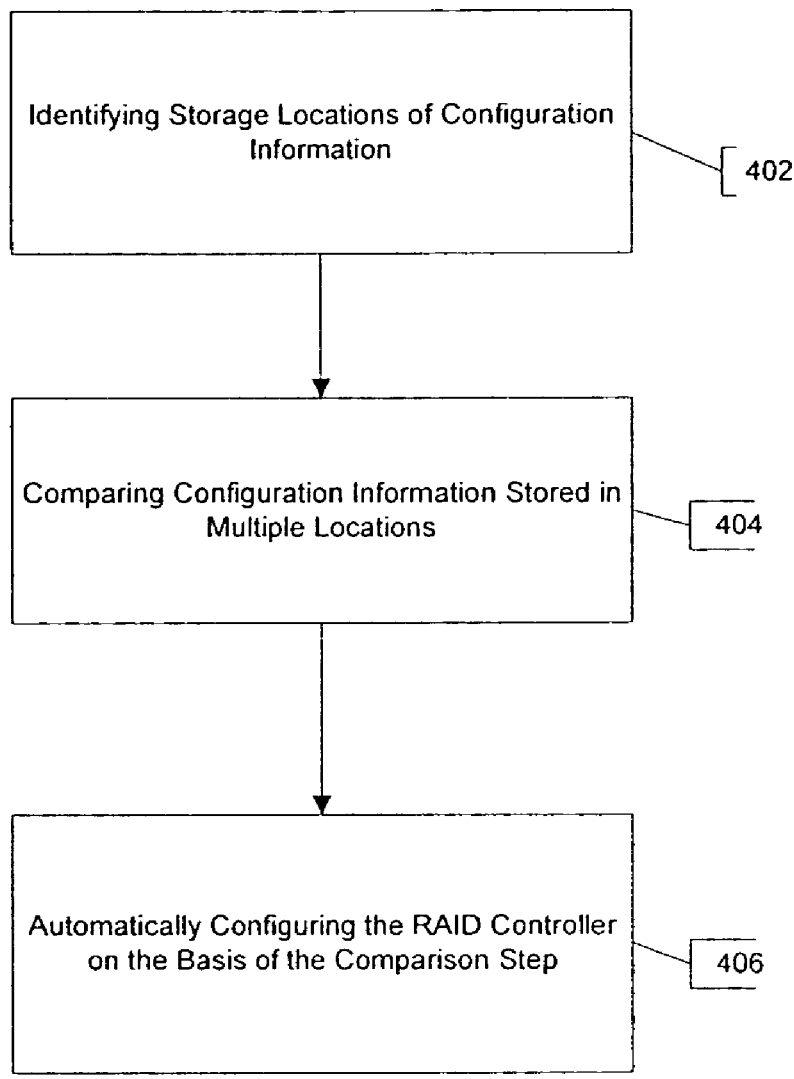
FIG. 6 is a flow diagram of method steps for identifying storage locations of configuration information, and automatically updating the RAID controller.

In still another implementation the configuration information may be stored in one of the RAID disk drives 130. In this implementation the RAID system will verify the configuration information stored in storage location 120 is equivalent to that stored in the RAID disk drive 130. Next the system may automatically update the RAID controller to contain the configuration information stored in storage location 120 and RAID disk 130. In this fashion the RAID system will automatically identify and arbitrate the configuration information stored in the RAID system such that the configuration information is updated to the RAID controller without user intervention. Moreover the default configuration of the operable RAID controller may be different from the configuration of the failed RAID controller. Therefore, the configuration information found in storage location 120 as well as disk drive 130 may be different from that stored in the operable RAID controller. Through this automatic arbitration system, the RAID system will identify multiple storage locations of the configuration information, e.g., storage 120, disk drive 130, and RAID planar 100. Thus, the RAID controller system may configure the RAID drives and controller based on a comparison of the configuration information stored in multiple locations. For example, assuming that equivalent configuration information is stored in two of the three storage locations, then the RAID controller may be updated to contain the equivalent configuration information. By providing a third storage site for RAID configuration information, the RAID drives and the RAID controller may be automatically configured following replacement of a failed controller or disk drive. Shown in FIG. 6 are a series of method steps for identifying storage locations of configuration information (step 402). comparing the configuration information stored in multiple locations (step 404). and automatically configuring the RAID controller on the basis of the comparison step (step 406).

Besides the RAID controller, the RAID drives may fail and thus require replacement. By providing a storage location for configuration information that is separate from both the RAID controller and RAID disk drives, configuration information can be automatically updated following replacement of a failed RAID controller or drive. For example, FIG. 1 shows two locations for storage of the configuration information, that being the backplane 110 and disk drive 130. When a failed controller is replaced, the user need not be prompted to identify the particular RAID configuration to be updated to the RAID controller. The RAID system can automatically identify two of the three storage locations for configuration information and then configure the hard drive controller based on those two out of the three choices found in the RAID system. In another implementation, the method shown in FIG. 1 can be used when replacing failed RAID disk drives 130. For example, if the disk drive fails, then the configuration information may be found on both the backplane and the RAID adapter controller. Likewise if the RAID adapter 100 fails, the configuration information may be found on the backplane 110 and the hard drive 130. Thus, the disclosed method provides an additional storage location for the configuration information such that if one of the components of the RAID system fails then at least two storage locations for the proper configuration information exists following replacement of the failed component. Based upon these two storage locations, the configuration of the replaced components may be updated to reflect the prior configuration of the RAID system.

Figure 2:
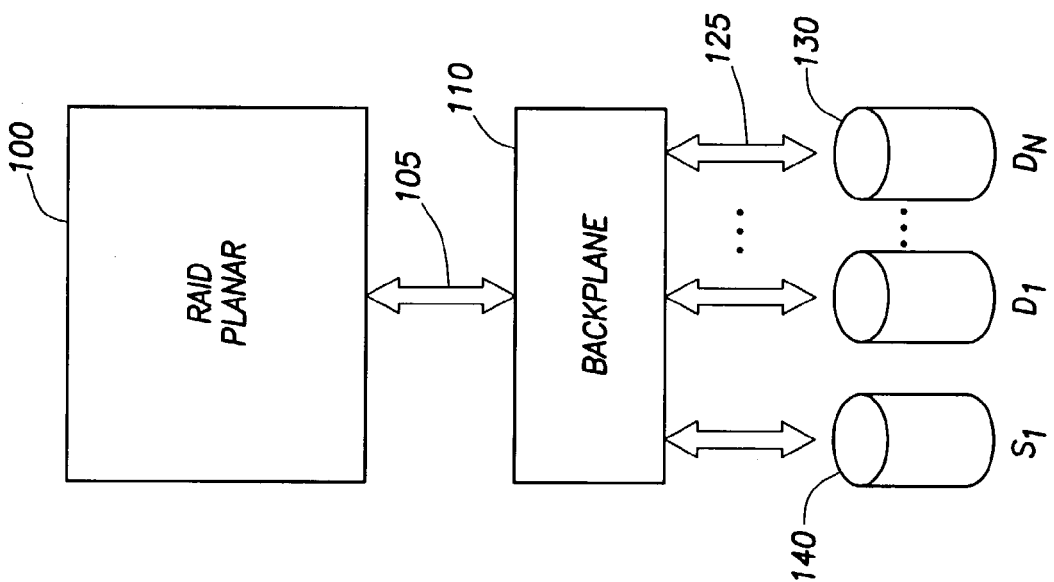
FIG. 2 is a diagram of a RAID system in which the configuration information is stored in a disk drive separate from the RAID disk drives.

FIG. 2 illustrates another implementation in which the configuration information is stored not on the backplane 110 but on a disk drive 140, which is separate from the RAID disk drive. This implementation includes the RAID planar 100 that comprises the RAID controller, and interface 105 which couples RAID controller to black backplane 110 and interfaces 125 which couple RAID disk drives 130 and storage disk drives 140 to the backplane 110. Following replacement of a failed component, the system will identify the RAID configuration information stored at 140. Additionally, similar to the implementation shown in FIG. 1, the RAID system may automatically update the configuration information in the replaced component. Otherwise the RAID system may prompt the user to choose the appropriate RAID configuration. In any event, the implementation shown in FIG. 2 includes a storage location for configuration information separate from that of the RAID adapter as well as the RAID disk drive.

In still another implementation, the configuration information may be stored on the system board itself. The configuration information may be stored in, for example, non-volatile random access memory or NVRAM, ROM or read only memory, or CD-ROM. In this case, following replacement of a failed component of the RAID system, e.g., either the RAID adaptor or RAID disk drives, the configuration information will be present on the system board. Therefore, the RAID system can either arbitrate the updating of the configuration information or prompt the user to choose appropriate configuration.

Figure 3:
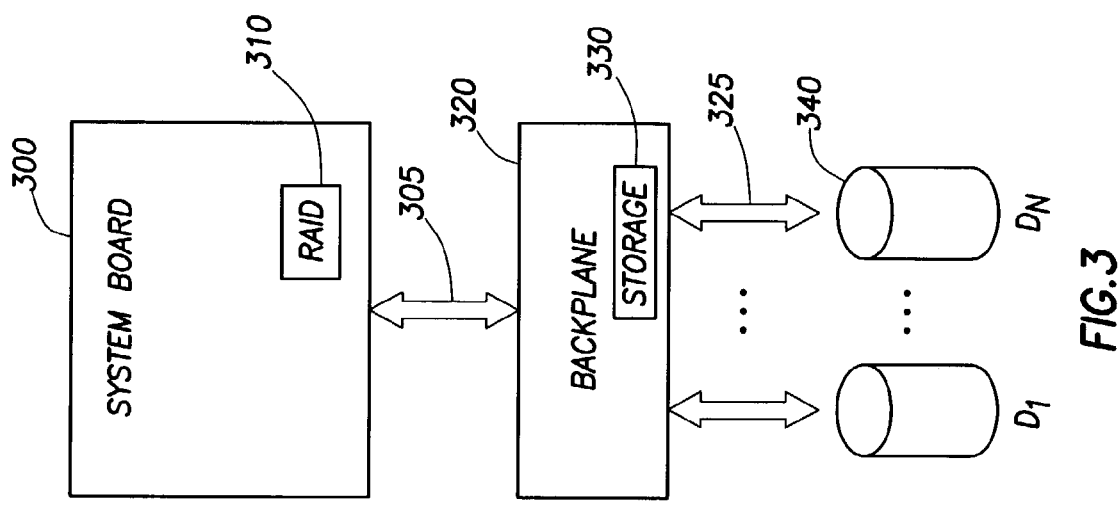
FIG. 3 is a diagram of a RAID system in which the configuration information is stored in the backplane of an information handling system and the RAID controller is embedded on the system board of the information handling system.

FIG. 3 illustrates an implementation in which the functionality of the RAID controller card is embedded in the system board 300. This configuration may be also known as RAID on the mother board (ROMB). FIG. 3 illustrates a system board 300, the RAID controller 310, an interface 305 that couples the system board to the backplane 320, and interface 325 that couples the backplane to disk drive 340. In the implementation shown in FIG. 3, the configuration information is stored in storage location 330 on the backplane. Following replacement of a failed system component, the RAID system will, based upon the identified configuration information, either arbitrate the updating of the configuration information in the RAID controller 310 or will prompt the user for selection of the RAID configuration information. In any event minimal user interaction is required. For example, if the system prompts the user for identification of the correct RAID configuration information, the user need not determine or input new RAID information. Additionally, the system may merely ask the user if the user chooses to accept the configuration information found in storage location 330. Therefore providing a storage location for configuration information that is separate from the components of the RAID system that may fail, the disclosed method for updating RAID configuration information reduces the amount of user intervention when updating RAID configuration information following replacement of a failed component.

Figure 4:
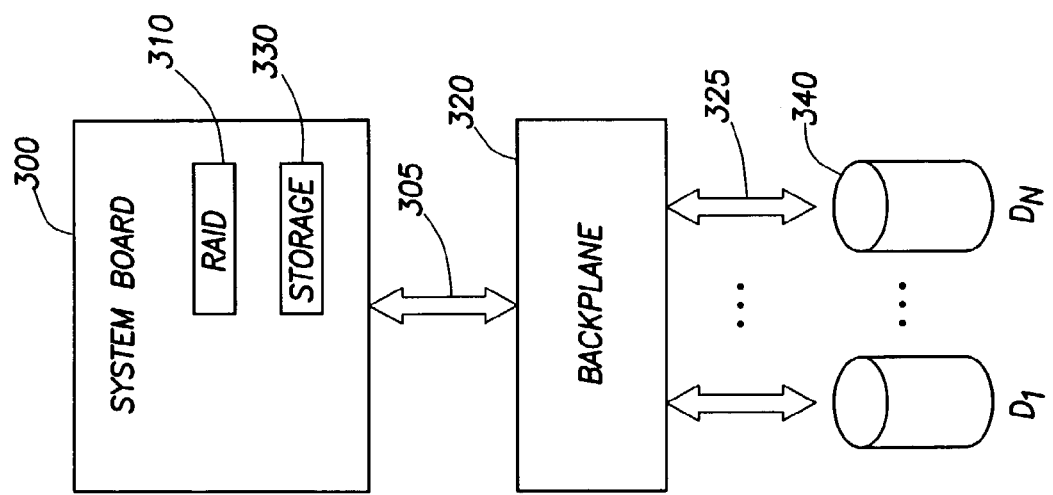
FIG. 4 is a diagram of a RAID system in which the configuration information is stored in one system board of an information handling system, the RAID controller is embedded on another system board of the information handling system.

The RAID system shown in FIG. 4 illustrates still another implementation. Here the storage location for the configuration information 330 is located on the system board. The system shown in FIG. 4 includes a system board 300, a RAID controller 310, the functionality of which may be embedded on a system board or may be included in an additional system board. The system also includes storage location 330 which may be embedded in the system board or included as a separate or additional board within the system board itself. Interface 305 couples the system board 300 to the backplane 320. Interfaces 340 couples RAID drives 340 to the backplane. For example, a battery backed up NVRAM may be placed on a board separate from that containing the RAID controller, such as on the system backplane. This NVRAM is used as a secondary repository for the RAID array's configuration. When a failure occurs, the RAID system would compare the information stored in the controller, the drives and the new NVRAM source of RAID array configuration and automatically arbitrate to select the configuration to be updated to the RAID system. Thus, following replacement of a failed system component the disclosed method updates the configuration information of the RAID system with minimal user intervention. In the implementation shown in FIG. 4, the third repository for storage and configuration information may be any board other than the board where the RAID controller is located. Therefore the integrity of the storage information is maintained following replacement of a failed system component.

Figure 5:
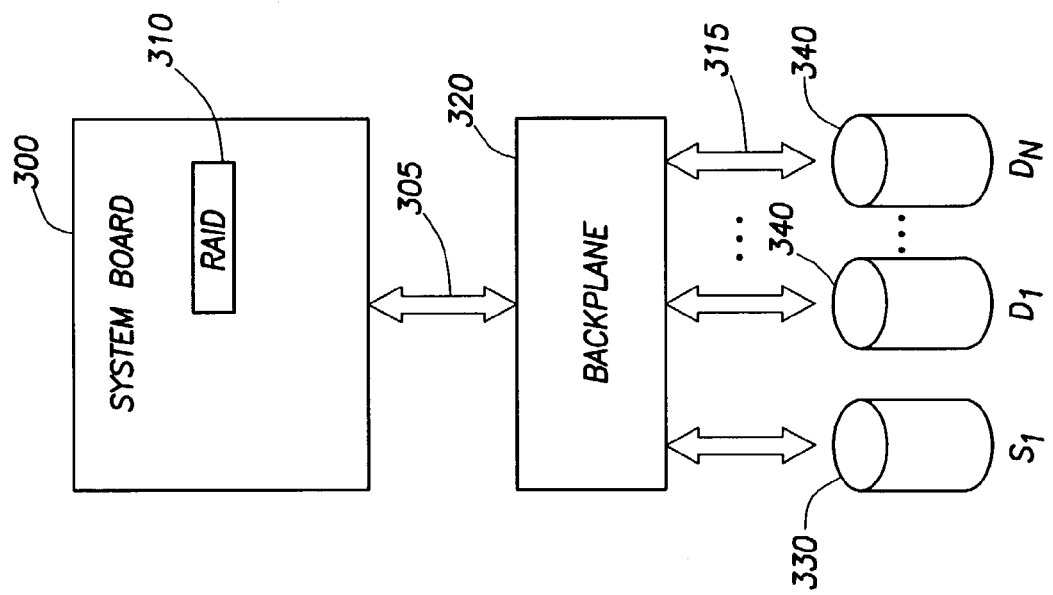
FIG. 5 is a diagram of a RAID system in which the configuration information is stored in a disk drive separate from the RAID drives.

In still another implementation shown in FIG. 5, configuration information for the RAID system may be stored in a disk drive 330. FIG. 5 illustrates a system board 300 that includes a RAID controller embedded on the system board or included as an additional system board 310, interface 305 that couples the system board 300 to the backplane 320. Additionally, interfaces 315 couple RAID disk drives 340 and storage drive 330 to backplane 320. Storage drive 330 stores the configuration information. Following replacement of a failed RAID component, the method disclosed herein automatically updates the RAID configuration information or updates the RAID configuration information with minimal user intervention.

One of the advantages of the disclosed methods for updating RAID configuration information is a reduction of error with respect to configuring the RAID system following replacement of a failed component. As a user is provided more opportunity to configure the RAID system, error may be introduced into the system. By reducing the amount of user intervention, the error in configuring a RAID system following failed board components will be reduced.

Although the present disclosure has been described in detail, it should be understood that various changes, substitutions, and alterations can be made hereto without departing from the spirit and the scope of the invention as defined by the appended claims.

What is claimed is:

1. A method for updating volume information associated with a RAID system, the RAID system including a RAID controller, one or more disk drives associated therewith, and three storage sites for volume information, the volume information identifying a data storage relationship among the one or more disk drives, wherein at least one of the storage sites for volume information is a site distinct from the RAID controller, wherein at least one of the storage sites for volume information is distinct from the one or more disk drives, wherein at least one of the storage sites for volume information is distinct from the RAID controller and from the one or more disk drives, and wherein an input device is coupled to the RAID system, the method comprising:

identifying the storage sites of volume information;

comparing the volume information stored in the storage sites;

if two of the three storage sites contain equivalent volume information, configuring the RAID system with the equivalent volume information that is included in two of the three storage sites.

2. The method of claim 1 wherein at least one of the storage sites is located on a backplane, and the backplane is coupled to the RAID system.

3. The method of claim 1, wherein at least one of the storage sites is located on a system board, the RAID controller is located on an adapter card, and the adapter card is coupled to the system board.

4. The method of claim 1, wherein at least one of the storage sites is located on a first system board, the RAID controller is located on a second system board, and the first system board is coupled to the second system board.

5. The method of claim 1, wherein at least one of the storage sites is a non-volatile storage site.

6. The method of claim 5, wherein the non-volatile memory storage site is non-volatile random access memory (NVRAM), read only memory (ROM), CD-ROM, or a hard disk drive.

7. The method of claim 1, wherein at least one of the storage sites is the RAID controller.

8. The method of claim 1, wherein at least one of the storage sites is associated with the RAID controller.

9. The method of claim 1, wherein at least one of the storage sites is at least one or more of the RAID disk drives.

10. A method for updating volume information associated with a storage system, the storage system including a storage controller, storage drives communicatively coupled to the storage controller, and three storage sites for volume information for the storage drives, wherein at least one of the storage sites for volume information is distinct from the storage controller, wherein at least one of the storage sites for volume information is distinct from the storage drives, and wherein at least one of the storage sites for volume information is distinct from the storage controller and from the storage drives, comprising:

identifying the storage sites of volume information;

comparing the volume information stored in the storage sites;

if two of the three storage sites contain equivalent volume information, configuring the storage system with the equivalent volume information that is included in two of the three storage sites.

11. The method of claim 10, wherein at least one of the storage sites is located on a backplane, and the backplane is coupled to the storage system.

12. The method of claim 10, wherein at least one of the storage sites is located on a system board, the storage controller is located on an adapter card, and the adapter card is coupled to the system board.

13. The method of claim 10, wherein at least one of the storage sites is located on a first system board, the storage controller is located on a second system board, and the first system board is coupled to the second system board.

14. The method of claim 10, wherein at least one of the storage sites is a non-volatile storage site.

15. The method of claim 14, wherein the non-volatile memory storage site is non-volatile random access memory (NVRAM), read only memory (ROM), CD-ROM, or a hard disk drive.

16. The method of claim 10, wherein at least one of the storage sites is the storage controller.

17. The method of claim 10, wherein at least one of the storage sites is associated with the storage controller.

18. The method of claim 10, wherein at least one of the storage sites is at least one or more of the storage drives.

* * * * *